US010207251B2

(12) United States Patent
Dufresne et al.

(10) Patent No.: US 10,207,251 B2
(45) Date of Patent: Feb. 19, 2019

(54) PROCESS FOR LIMITING THE EMISSIONS OF GASES FROM POROUS PARTICLES

(71) Applicant: EURECAT S.A, La Voulte-sur-Rhone (FR)

(72) Inventors: Pierre Dufresne, Aouste sur Sye (FR); Pauline Galliou, Saint Laurent du Pape (FR); Mathieu Baffert, Guilherand Granges (FR); Fabien Laboulfie, Valence (FR)

(73) Assignee: Eurecat S.A. (FR)

( * ) Notice: Subject to any disclaimer, the term of this patent is extended or adjusted under 35 U.S.C. 154(b) by 0 days.

(21) Appl. No.: 15/392,176

(22) Filed: Dec. 28, 2016

(65) Prior Publication Data

US 2017/0182476 A1 Jun. 29, 2017

(30) Foreign Application Priority Data

Dec. 28, 2015 (FR) ..................................... 15 63367

(51) Int. Cl.
| | |
|---|---|
| *B01J 2/10* | (2006.01) |
| *B01J 2/12* | (2006.01) |
| *B01J 2/16* | (2006.01) |
| *B01J 20/26* | (2006.01) |
| *B01J 20/08* | (2006.01) |
| *B01J 20/28* | (2006.01) |
| *B01J 20/32* | (2006.01) |
| *B01J 21/04* | (2006.01) |
| *B01J 23/882* | (2006.01) |
| *B01J 31/06* | (2006.01) |
| *B01J 31/34* | (2006.01) |
| *B01J 35/00* | (2006.01) |
| *B01J 37/02* | (2006.01) |
| *B01J 2/00* | (2006.01) |
| *B01J 23/85* | (2006.01) |
| *B01J 33/00* | (2006.01) |
| *B01J 23/94* | (2006.01) |
| *B01J 23/883* | (2006.01) |

(Continued)

(52) U.S. Cl.
CPC ............. *B01J 20/261* (2013.01); *B01J 2/006* (2013.01); *B01J 20/08* (2013.01); *B01J 20/28016* (2013.01); *B01J 20/3204* (2013.01); *B01J 20/3231* (2013.01); *B01J 20/3293* (2013.01); *B01J 21/04* (2013.01); *B01J 23/85* (2013.01); *B01J 23/882* (2013.01); *B01J 23/883* (2013.01); *B01J 23/888* (2013.01); *B01J 23/94* (2013.01); *B01J 31/06* (2013.01); *B01J 31/34* (2013.01); *B01J 33/00* (2013.01); *B01J 35/002* (2013.01); *B01J 35/0006* (2013.01); *B01J 37/0219* (2013.01); *B01J 37/0221* (2013.01); *B01J 37/0232* (2013.01); *B01J 35/023* (2013.01); *B01J 35/026* (2013.01); *B01J 35/1019* (2013.01); *B01J 35/1038* (2013.01); *B01J 35/1042* (2013.01); *B01J 35/1061* (2013.01)

(58) Field of Classification Search
CPC ..... B01J 20/261; B01J 2/10; B01J 2/12; B01J 2/16; B01J 2/006; B01J 20/08; B01J 20/28016; B01J 20/28026; B01J 20/3204; B01J 20/3231; B01J 20/3293; B01J 20/3297; B01J 21/04; B01J 23/85; B01J 23/882; B01J 23/883; B01J 23/888; B01J 23/94; B01J 31/06; B01J 31/34; B01J 33/00; B01J 35/0006; B01J 35/002; B01J 37/0219; B01J 37/0221; B01J 37/0223; B01J 35/023; B01J 35/026; B01J 35/1019; B01J 35/1038; B01J 35/1042; B01J 35/1061; B01D 1/60; C01P 2004/64; B05D 1/60
USPC ............... 502/159, 305, 313, 317, 325, 328; 428/403; 427/212, 213, 215, 213.31, 427/213.36, 220, 221, 255.25, 255.6
See application file for complete search history.

(56) References Cited

U.S. PATENT DOCUMENTS

| | | |
|---|---|---|
| 2,976,253 A | 3/1961 | Edwards |
| 3,453,217 A | 7/1969 | Kozlowski et al. |

(Continued)

FOREIGN PATENT DOCUMENTS

| | | |
|---|---|---|
| CH | 404380 A | 12/1965 |
| EP | 0311508 A1 | 4/1989 |

(Continued)

OTHER PUBLICATIONS

Kleinbach et al. "Coating of solids". Chemical Engineering and Processing 34 (1995) 329-337.

*Primary Examiner* — Patricia L. Hailey
(74) *Attorney, Agent, or Firm* — Hahn Loeser & Parks LLP; Bret A. Hrivnak

(57) ABSTRACT

A process is disclosed for limiting the emissions of gases from a porous material in the form of particles comprising a porous inorganic support and at least 0.1% by weight of one or more compounds chosen from organic compounds, halogen compounds, boron compounds and phosphorus compounds. The particles are placed in motion within a hot gas stream traversing them, and a liquid composition containing one or more film-forming polymer(s) is sprayed over the moving particles by means of a twin-fluid atomization nozzle, in which the liquid composition is mixed with a pressurized gas, with a relative atomization pressure of greater than or equal to $0.7 \times 10^5$ Pa, until a protective layer containing the film-forming polymer(s) and exhibiting a mean thickness of less than or equal to 20 μm is obtained on the surface of the said particles. A material resulting from this process is also disclosed.

20 Claims, No Drawings

(51) Int. Cl.
*B01J 23/888* (2006.01)
*B01J 35/02* (2006.01)
*B01J 35/10* (2006.01)

(56) References Cited

U.S. PATENT DOCUMENTS

| | | | |
|---|---|---|---|
| 4,363,285 A | | 12/1982 | Yoshida et al. |
| 4,476,804 A | | 10/1984 | Glatt et al. |
| 4,548,138 A | * | 10/1985 | Korenberg ............... B01J 8/26 110/244 |
| 4,579,689 A | * | 4/1986 | Hershman ............... B01J 23/40 562/17 |
| 4,759,956 A | * | 7/1988 | Amer ...................... B01J 2/003 252/186.26 |
| 4,956,322 A | | 9/1990 | Gouzard et al. |
| 5,182,016 A | * | 1/1993 | Funkenbusch .......... B01J 20/06 210/198.2 |
| 5,585,184 A | * | 12/1996 | Baker ...................... C08F 10/00 428/402 |
| 5,681,787 A | | 10/1997 | Seamans et al. |
| 6,294,498 B1 | | 9/2001 | Darcissac et al. |
| 7,070,820 B2 | * | 7/2006 | Simonsen ............... A21D 8/042 426/549 |
| 7,566,369 B2 | | 7/2009 | Wittebrood |
| 8,278,234 B2 | | 10/2012 | Galliou et al. |
| 8,287,999 B2 | * | 10/2012 | Schmidt .................. A61L 15/26 428/327 |
| 8,668,848 B2 | * | 3/2014 | Vanheusden ............ H01B 1/22 252/512 |
| 2004/0220318 A1 | * | 11/2004 | Lepkowski ............... C08F 2/00 524/449 |
| 2005/0250879 A1 | * | 11/2005 | Correll .................. C08K 3/0008 523/221 |
| 2005/0267269 A1 | * | 12/2005 | Hagerty ................. C08F 210/16 526/68 |
| 2006/0286378 A1 | * | 12/2006 | Chiruvolu .......... G03G 9/09307 428/402 |
| 2008/0096018 A1 | * | 4/2008 | Zhang ..................... C03C 10/00 428/402 |
| 2013/0157127 A1 | * | 6/2013 | Hirose .................. B60L 3/0046 429/211 |
| 2016/0001279 A1 | * | 1/2016 | Dufresne ............... B01J 37/0232 502/159 |
| 2016/0030937 A1 | | 2/2016 | Gabriel et al. |
| 2017/0182476 A1 | * | 6/2017 | Dufresne ................. B01J 23/94 |

FOREIGN PATENT DOCUMENTS

| | | | |
|---|---|---|---|
| EP | 0897748 | 2/1999 | |
| EP | 2174711 | 4/2010 | |
| EP | 2781262 | 9/2014 | |
| EP | 2962757 | 1/2016 | |
| FR | 2758824 | 7/1998 | |
| JP | 55-086533 | * 6/1980 | ............. B01J 37/00 |
| WO | 2015197712 | 12/2015 | |

\* cited by examiner

PROCESS FOR LIMITING THE EMISSIONS OF GASES FROM POROUS PARTICLES

This application claims priority to French patent application no. FR 1563367, filed Dec. 28, 2015 with the French Patent Office (INPI), which is hereby incorporated by reference.

The present invention has as subject-matter a process targeted at limiting the emissions of gases from porous materials in the form of particles comprising certain specific compounds, in particular during their storage, their handling and their transportation.

More specifically, the process according to the invention makes it possible to limit the emissions of undesirable gases, such as in particular gases having an unpleasant smell and/or toxic gases, that may be emitted by porous materials which are under the form of particles and which contain one or more compounds chosen from organic compounds, halogen compounds, boron compounds and phosphorus compounds.

Another subject-matter of the present invention is the material based on coated particles obtained by means of the process of the invention.

The porous materials in the form of particles concerned by the present invention are in particular catalysts and adsorbent agents employed in industrial processes.

The catalysts concerned can in particular but not limitingly be those employed in processes for the treatments of hydrocarbons, for example in the fields of oil refining and petrochemicals.

The processes for the treatment of hydrocarbons carried out in refineries and/or petrochemical units include a certain number of treatments carried out optionally in the presence of hydrogen which are intended to modify the structure of hydrocarbon molecules and/or to remove undesirable compounds, such as in particular sulphur-comprising, nitrogen-comprising, aromatic or metal compounds, from hydrocarbon fractions. Mention may be made, as nonlimiting examples, of hydrocracking or hydroconversion, reforming, isomerization, alkylation, hydrogenation or dehydrogenation processes and "hydrotreating" processes, such as hydrodesulphurization, hydrodenitrogenation, hydrodearomatization, hydrodemetallization or hydrodeoxygenation processes.

The majority of these processes for the treatment of hydrocarbons use solid catalysts which are provided in the form of particles also known as "catalyst grains" and which generally comprise a porous support based on one or more refractory inorganic oxides on which one or more catalytically active metals are deposited. These metals generally comprise one or more metals from Group VIII of the Periodic Table of the Elements and/or one or more metals from Group VIb.

These catalysts increasingly also contain additional compounds added during their manufacture and/or intended to improve the properties thereof such as in particular halogen, boron, phosphorus or organic compounds. These compounds can be deposited at the surface of the catalyst particles (generally in the pores of the catalyst) or incorporated in the actual structure of the porous support.

However, the Applicant Company has found that the presence of these specific compounds is liable to cause undesirable releases of gas, in particular when these compounds are volatile or when they are likely to decompose to give volatile compounds.

Thus, the catalysts containing the abovementioned compounds are likely to emit gases, for example during their storage, their handling and/or their transportation, which presents various disadvantages.

This is because the releases of gas can exhibit odours which are particularly unpleasant for the personnel obliged to handle these particles.

In addition, the gases emitted by these catalysts can prove to be harmful, indeed even toxic. Thus, for example, the catalysts containing oxygen-comprising organic compounds can give rise to releases of carbon monoxide related to the partial decomposition of these organic compounds. In point of fact, carbon monoxide is in a well known way a toxic gas, including at very low concentrations, which renders the handling of these catalysts particularly problematic.

The catalysts which have been prepared or treated in the presence of an organic solvent can contain traces of residual solvent and can give rise to undesirable emissions of solvents or of decomposition products of the latter.

The catalysts containing nitrogen-comprising compounds, sulphur-comprising and/or nitrogen-comprising organic compounds, such as those described, for example, in Patent application EP 2 174 711, can give rise to emissions of sulphur-comprising or nitrogen-comprising gases containing such organic compounds or decomposition products of the latter. The gases emitted may have a particularly strong and unpleasant odour.

Other nonlimiting examples of catalysts liable to emit undesirable gases are isomerization catalysts containing halogen compounds, which can, under certain conditions, emit hydrogen chloride.

These gas emissions present several problems, not only undesirable odours but also toxicity, and even of explosiveness or of flammability.

The same problem occurs in the use of adsorbent agents (also denoted by "adsorbents"), employed in a broad range of industrial applications extending from the purification of gas or liquid streams to the separation of gas or liquid mixtures.

These adsorbent agents generally consist of one or more porous materials chosen from active charcoals, zeolites, aluminas, silica gels and activated clays, in the form of particles. These adsorbent agents can, in the same way as the catalysts, give rise to releases of gases which are undesirable, indeed even toxic, for man and/or the environment.

Thus, specific precautions have to be taken during the storage, transportation and handling of these materials due to the gas emissions, this being all the more the case when toxic gases, for which the risk for the personnel handling these materials is particularly high, are concerned.

There thus exists a need to find novel solutions which make it possible to reduce as much as possible the potential emissions of gases from these porous materials in the form of particles containing organic compounds, halogen compounds, boron compounds and/or phosphorus compounds.

The present invention is targeted at providing a method which makes it possible to efficiently and safely overcome the abovementioned problems.

The Applicant Company has discovered that this objective was achieved by covering the particles with a very fine protective layer of one or more film-forming polymer(s) by means of a process in which the particles are kept moving within a hot gas stream while a liquid composition containing the film-forming polymer(s) is sprayed over the said particles.

According to the invention, the spraying is carried out using a twin-fluid atomization nozzle in which the liquid composition is mixed with a pressurized gas, preferably compressed air, making it possible to obtain very fine drops.

In order to obtain a protective layer of good quality, having in particular a good homogeneity, the relative atomization pressure is greater than or equal to $0.7 \times 10^5$ Pa.

The process according to the invention has the objective of forming a homogeneous layer of a protective material at the external surface of the particles. The Applicant Company has in particular discovered that, in order to effectively limit the releases of gas, it was necessary to combine specific protective materials based on film-forming polymers with a coating process carried out under specific conditions.

The subject-matter of the present invention is thus a process for limiting the emissions of gases from a porous material in the form of particles comprising a porous inorganic support and at least 0.1% by weight of one or more compounds chosen from organic compounds, halogen compounds, boron compounds and phosphorus compounds. According to the invention, the particles are placed in motion within a hot gas stream traversing them, and a liquid composition containing one or more film-forming polymer(s) is sprayed over the moving particles by means of a twin-fluid atomization nozzle, in which the liquid composition is mixed with a pressurized gas, with a relative atomization pressure of greater than or equal to $0.7 \times 10^5$ Pa, until a protective layer containing the film-forming polymer(s) and exhibiting a mean thickness of less than or equal to 20 μm is obtained on the surface of the said particles.

The process according to the present invention makes it possible to very significantly limit, indeed even to completely eliminate, the releases of gases from particles formed of porous materials comprising a porous inorganic support and at least 0.1% by weight of one or more compounds chosen from organic compounds, halogen compounds, boron compounds and phosphorus compounds.

The particles, in particular of catalysts or of adsorbent agents, treated by means of the process of the invention can thus be stored or transported in large amounts, for example in high-volume bags or containers, and handled (for example, charged to industrial reactors) without specific precautions.

In addition, the Applicant Company has found that the process according to the invention makes it possible for the industrial units for which the particles of catalyst or of adsorbent agent are intended to retain an excellent effectiveness, without there being substantially a loss of activity resulting from the charging of the particles covered with the specific protective layer obtained by this process.

Finally, the use of such a protective layer does not substantially effect the activity of the catalyst or of the adsorbent agent, which, once freed from the protective layer according to the invention, retains a good activity.

In accordance with the invention, the porous particles are covered with a protective layer comprising one or more film-forming polymer(s).

"Polymer" is understood to mean, within the meaning of the invention, compounds comprising at least two repeat units, preferably at least three repeat units and more especially at least ten repeat units.

"Film-forming polymer" denotes, in a way known per se, a polymer capable of forming, by itself alone or in the presence of an auxiliary film-forming agent, a macroscopically continuous film on a support, in particular on materials based on inorganic oxides, such as, for example alumina.

The protective layer according to the invention can comprise one or more film-forming polymer(s) as a mixture with one or more other compound(s) which can be polymeric or nonpolymeric. The other compounds, polymeric or nonpolymeric, likely to be present in the protective layer according to the invention are then introduced as a mixture with the film-forming polymer(s) in the liquid composition sprayed over the moving particles.

The protective layer can also consist entirely of one or more film-forming polymer(s).

Preferably, the protective layer according to the invention comprises from 50 to 100% by weight of one or more film-forming polymer(s). Particularly preferably, the protective layer according to the invention consists entirely of one or more film-forming polymer(s).

Preferably, the film-forming polymer(s) employed in the present invention are chosen from:
  vinyl alcohol homo- and copolymers, such as:
  polyvinyl alcohols;
  copolymers formed from vinyl alcohol and olefin monomers, such as the copolymers formed from vinyl alcohol and ethylene monomers (EVOH copolymers); and
  partially hydrolyzed vinyl alcohol copolymers, that is to say still containing nonhydrolyzed vinyl acetate units;
  polyethylene glycols;
  collagen;
  polyethylene terephthalates (PET);
  polyethylene naphthalates (PEN);
  polyamides;
  polysaccharides, in particular cellulose polymers and their derivatives (among which preference is given in particular to $C_1$-$C_4$ alkyl celluloses and more particularly methyl celluloses), and starches, which are optionally modified;
  polyvinyl chlorides (PVCs);
  polyvinylidene chlorides (PVDCs);
  polyacrylonitriles (PANs);
  polyacrylate resins, such as, in particular, polymethyl acrylates;
  copolymers, at least one of the monomers of which is of acrylate type;
  and their mixtures.

Polyvinyl alcohols and the copolymers formed from vinyl alcohol and olefin monomers are particularly preferred. Among the latter, preference is very particularly given to the copolymers formed of vinyl alcohol and ethylene monomers or EVOH copolymers.

The mean thickness of the protective layer according to the invention is less than or equal to 20 μm, and preferably less than or equal to 10 μm.

More preferably, the mean thickness of the protective layer ranges from 0.1 to 10 μm, more preferably still from 0.5 to 10 μm, and better still from 2 to 8 μm.

The mean thickness of the layer covering the particles can be determined by scanning electron microscopy.

According to the present invention, the amount of film-forming polymer employed has to be sufficient to make it possible to cover the particles as completely as possible, while taking care that the protective layer remains as fine as possible.

To this end, the total amount of film-forming polymer employed advantageously ranges from 0.1 to 4% by weight, preferably from 0.5 to 4% by weight and more preferably still from 1 to 3% by weight, with respect to the total weight of the initial particles.

The total weight of the initial particles denotes here the weight of the unprotected particles, that is to say before covering the latter with the protective layer according to the invention.

The film-forming polymer(s) and also the other compound or compounds optionally present in the protective layer according to the invention are deposited on the particles by spraying a liquid composition containing them.

According to a first embodiment, the liquid composition sprayed over the particles contains a solvent chosen from water, an organic solvent or a mixture of water and of organic solvent, and also the film-forming polymer(s) dissolved or dispersed in the said solvent. It can also contain, if appropriate, one or more stabilizing agents.

In the case of water-sensitive catalysts or adsorbent agents, use is preferably made of one or more organic solvent(s).

In the case where the liquid composition is a solution or a dispersion of film-forming polymer in a solvent, the said composition advantageously contains from 0.1 to 50% by weight of film-forming polymer, preferably from 0.5 to 25% by weight and more preferably from 1 to 10% by weight of film-forming polymer, with respect to the total weight of the composition.

In the case of a dispersion of the film-forming polymer(s) in a solvent, the size of the particles of dispersed polymer is advantageously less than or equal to 500 nm and preferably less than or equal to 200 nm.

According to a second embodiment, the liquid composition sprayed over the particles contains the film-forming polymer(s) in the molten state. In particular, the liquid composition sprayed over the particles can consist entirely of the film-forming polymer(s) in the molten state.

According to the invention, the particles are placed in motion within a hot gas stream traversing them, that is to say within a gas stream passing through the mass of the particles in motion.

Any device which makes it possible to achieve this objective can be employed in the context of the present invention.

According to a first embodiment, the process according to the invention can be carried out in a perforated drum in which the particles are placed in motion and the perforated drum is traversed continuously by a hot gas stream.

According to a second embodiment, the process according to the invention can be carried out by placing the particles in a bed fluidized by means of the hot gas stream.

In the two embodiments, the process according to the invention can be carried out batchwise or continuously.

The hot gas stream traversing the particles in motion can consist of any gas or gas mixture, such as, for example, an inert gas, such as nitrogen, air or a mixture of these gases. Preferably, it is a stream of air.

However, in the case of an oxygen-sensitive porous material, an inert gas, such as nitrogen, is used.

"Hot" gas stream is understood to mean a gas stream, the temperature of which is greater than ambient temperature, that is to say greater than 25° C.

Advantageously, the gas stream traversing the particles exhibits a temperature ranging from 30 to 150° C., and preferably from 50 to 100° C.

The flow rate of the gas stream is advantageously from 5 to 100 m$^3$ per hour and per kilogram of catalyst.

The composition containing the film-forming polymer(s) is sprayed in the form of fine droplets, preferably continuously, over the particles in motion.

According to the present invention, the spraying is carried out by atomization by means of a twin-fluid atomization nozzle with a relative atomization pressure of greater than or equal to $0.7 \times 10^5$ Pa.

The twin-fluid atomization nozzles constitute devices known per se. They are spray devices in which the liquid composition to be sprayed is mixed with a pressurized gas, so as to atomize it and to project it in the form of fine droplets.

Preferably, the pressurized gas is compressed air.

According to the invention, the relative atomization pressure is greater than or equal to $0.7 \times 10^5$ Pa. The relative atomization pressure corresponds to the difference in pressure between the pressure of the gas inside the nozzle and atmospheric pressure.

Preferably, the relative atomization pressure ranges from $0.7 \times 10^5$ to $4 \times 10^5$ Pa, more preferably from $1.2 \times 10^5$ to $3 \times 10^5$ Pa, more preferably still from $1.5 \times 10^5$ to $2.5 \times 10^5$ Pa, and better still from $1.7 \times 10^5$ to $2.3 \times 10^5$ Pa.

Generally, the liquid composition is advantageously sprayed at a temperature ranging from 25 to 250° C.

In the case where the liquid composition contains the film-forming polymer(s) in the form dissolved or dispersed in a solvent, the said composition is preferably sprayed at a temperature ranging from 25 to 100° C.

In the case where the liquid composition contains the film-forming polymer(s) in the molten state, the said composition is preferably sprayed at a temperature ranging from 50 to 250° C.

In the case where the process according to the invention is carried out in a perforated drum, the spraying is preferably carried out over the upper surface of the bed of moving particles.

In the case where the process according to the invention is carried out by placing the particles in a fluidized bed, the spraying can be carried out either over the upper surface of the bed of particles or directly inside the bed.

The process according to the invention can be carried out in batch mode or in continuous mode. According to a particularly preferred embodiment, it is carried out in a perforated drum operating in continuous mode.

The processes described above make possible the formation of a homogenous protective layer at the external surface of the porous particles, which guarantees a maximum effectiveness of the process according to the invention.

After covering the particles using a protective layer according to the invention, the said particles can be dried, if necessary, for example in the open air or in the presence of a gas stream of air or of any other appropriate gas.

The process according to the present invention can be applied in particular to any solid catalyst provided in the form of particles, such as but not limitingly those intended for the treatment of hydrocarbon feedstocks, in particular in the fields of oil refining and petrochemicals.

The process according to the invention applies, for example, to the treatment of catalysts for the hydroconversion of hydrocarbons. These catalysts are provided in the form of particles which comprise a refractory oxide support on which there is deposited at least one metal oxide chosen from the metals of Group VIII and the metals of Group VIb of the Periodic Table of the Elements.

Thus, according to one embodiment, the porous material in the form of particles is chosen from catalysts comprising a refractory oxide support on which is deposited at least one metal or metal compound.

Preferably, the catalyst comprises at least one metal chosen from the metals of Group VIII of the Periodic Table of the Elements and/or at least one inorganic compound of such a metal. The corresponding metals can, for example, be cobalt, nickel, iron, palladium or platinum.

The catalyst can in addition comprise at least one metal chosen from the metals of Group VIb of the Periodic Table of the Elements and/or at least one inorganic compound of such a metal. The corresponding metals can, for example, be molybdenum, tungsten or chromium.

The content of metal or metals from Group VIII is generally between 0.1 and 20% by weight, with respect to the total weight of the unprotected catalyst, sometimes up to 50%.

The content of metal or metals from Group VIb is generally between 3 and 30% by weight, with respect to the total weight of the catalyst (in the unprotected form).

Preferably, the porous support of the catalysts can be chosen in particular from aluminas, silicas or amorphous or crystalline aluminosilicates (zeolites). More preferably, the support contains at least 30% by weight and even better still at least 50% by weight of alumina.

The process according to the invention is particularly appropriate for treating catalysts containing one of the following metal combinations: CoMo, NiMo, NiW or NiCoMo, deposited on an alumina-based support.

The catalysts targeted by the invention are provided in the form of particles of variable shapes, preferably spherical, cylindrical or multilobal, the maximum number-average dimension of which generally does not exceed 5 mm.

For the catalyst particles in the form of cylindrical or multilobal shape, the number-average diameter generally ranges from 0.8 to 4 mm and the number-average length generally ranges from 2.5 to 5 mm. In some applications, particles of spherical shape are used, the number-average diameter of which generally varies from 1.5 to 5 mm.

The number-average dimensions of the catalyst particles can be determined, in a way known per se, by video particle size determination or using a caliper. Use may specifically be made of the Camsizer video particle size analyzer developed by Retsch.

These catalysts can exhibit a specific surface, measured by the BET method, generally of between 100 and 300 $m^2/g$, a pore volume, determined by nitrogen adsorption, ranging from 0.20 to 1 ml/g, and a mean pore diameter, determined by nitrogen adsorption, ranging from 7 to 20 nm.

It should be noted that, even if in the present disclosure the invention is described with regard to the specific catalysts employed in processes for the treatment of hydrocarbons, the process of the invention can be employed to protect any catalyst provided in the form of solid particles comprising a porous inorganic support.

The process according to the present invention can also be applied to any solid adsorbent agent in the form of porous particles, such as, for example, those intended for the separation and/or for the purification of liquid or gaseous feedstocks.

These adsorbents comprise one or more porous materials generally chosen from active charcoals, zeolites (or molecular sieves), aluminas, silica gels and activated clays.

Some adsorbents can additionally contain metals, such as, for example, metals from Groups VIIIb, Ib and IIb of the Periodic Table of the Elements or compounds of such metals.

These adsorbent agents are provided in the form of particles which can exhibit various shapes, such as, for example and without limitation, spheres, cylinders, multilobal grains or pellets, the maximum average dimension of which generally does not exceed 5 mm.

They exhibit a specific surface, measured by the BET method, which can range up to 1000 $m^2/g$ and a pore volume, determined by nitrogen adsorption, which can range up to values of the order of 1.5 ml/g.

Mention may be made, as examples of such adsorbent agents, for example, of molecular sieves of 3A, 4A, 5A and 13X type employed, inter alia, to dry gas streams; adsorbents based on sodium aluminate employed in particular to trap acidic chlorinated compounds; active charcoals employed in numerous applications, for example in order to selectively trap organic compounds in various gaseous or liquid fluids; nickel-containing adsorbents intended to trap traces of sulphur-comprising compounds in gaseous fluids; adsorbents specific for the adsorption of mercury in gaseous or liquid fluids, such as, for example, active charcoals containing or not containing sulphur or based on metal sulphides, such as that of copper.

The process according to the present invention applies both to fresh catalysts and adsorbents, that is to say catalysts and adsorbents which have never yet been employed, and to used catalysts and adsorbents. It also fully applies to regenerated catalysts and adsorbents, that is to say used catalysts and adsorbents which have been regenerated in order to free them from their contaminants and to restore to them a level of activity which allows them to be reused.

It very particularly applies to particles (in particular catalyst or adsorbent particles) containing one or more compounds chosen from organic compounds, halogen compounds, boron compounds and phosphorus compounds, in a total content of at least 0.1% by weight, with respect to the total weight of the said particles. This is because these particles are particularly likely to emit undesirable harmful (possibly toxic) and/or odorous gases and the process according to the invention has proved to be particularly effective in preventing these phenomena.

Preferably, the porous particles contain one or more organic compounds.

Organic compound denotes compounds containing at least one carbon atom and at least one hydrogen atom. These compounds can also contain heteroatoms (for example S, N, O, halides, metals, and the like).

The organic compounds present can be polymeric or nonpolymeric compounds. These compounds can also contain, apart from the carbon and hydrogen atoms, one or more heteroatoms, such as, in particular, oxygen, nitrogen or sulphur atoms.

These compounds can be present in the actual structure of the particles or simply deposited at their surface, for example in the pores.

Preferably, the organic compound or compounds comprise from 1 to 15 carbon atoms and more preferably from 2 to 10 carbon atoms. Preferably again, these compounds additionally contain one or more heteroatoms chosen from oxygen, nitrogen and sulphur.

Particularly preferably, such organic compounds have been deposited at the surface of the material (for example at the end of its preparation or of its regeneration). The techniques which make it possible to deposit organic compounds at the surface of porous particles are well known to a person skilled in the art. It is possible, for example, to proceed by impregnation of the particles to saturation of the pore volume using a solution containing these compounds.

Preferably, the organic, halogen, boron and/or phosphorus compounds are present in a total content ranging from 0.1 to 20% by weight, preferably from 0.5 to 15% by weight, more preferably from 1 to 10% by weight and better still from 1.5 to 5% by weight, with respect to the total weight of the said particles (that is to say, before protection using the layer of film-forming polymer according to the invention).

The deprotection of the particles is preferably carried out once the latter have been charged to the industrial unit for which they are intended.

It is advantageously carried out by placing the said particles under conditions under which the protective layer present at the surface of the particles is removed.

Particularly preferably, the film-forming polymer(s) employed in the present invention are chosen so that it/they is/are spontaneously removed on contact with the feedstock or by thermal degradation during the start-up of the unit in which the particles are employed. This embodiment makes it possible to remove, in a particularly simple and economical way, the protective layer covering the particles at the time of the start-up of the unit.

Thus, the film-forming polymer(s) are preferably chosen from polymers which break down or which are leached by the feedstock at the temperatures between ambient temperature and the operating temperature of the unit, that is to say, typically, at a temperature ranging from 25° C. to 400° C., and at a pressure ranging from atmospheric pressure to 20 MPa.

More preferably, the film-forming polymer(s) are chosen from the compounds which break down or are leached by the feedstock at a temperature ranging from 50° C. to 400° C., preferably from 100 to 300° C. and at a pressure ranging from 0.1 to 10 MPa.

Feedstock denotes, in the case of the catalysts for the treatment of hydrocarbons, hydrocarbon fractions which typically have a boiling range at atmospheric pressure within the range extending from 75 to 650° C. and which can be brought into contact with the catalyst in the liquid or gas state.

In the case of the adsorbents, the feedstocks capable of being treated include all types of liquid or gas and organic or inorganic feedstocks.

Finally, a subject-matter of the present invention is the porous material in the form of particles covered with a homogeneous protective layer, which material is capable of being obtained by the process described above.

The particles, for example of catalyst or of adsorbent agent, constituting this material are each covered, at their surface, with a protective layer comprising one or more film-forming polymer(s). This layer is advantageously homogeneous and exhibits a mean thickness preferably ranging from 0.1 to 20 μm.

The quality of the layer and in particular its good homogeneity can be evaluated by measuring the homogeneity in the thickness of the layer, as described in the examples below.

Preferably, the particles of porous materials obtained by the process according to the invention exhibit a homogeneity in layer thickness of greater than or equal to 65% and more preferably of greater than or equal to 70%.

As set out above, the protective layer preferably consists entirely of one or more film-forming polymer(s).

The film-forming polymer or polymers represent from 0.1 to 4% by weight, with respect to the total weight of the particles, and are chosen from:
vinyl alcohol homo- and copolymers, such as:
polyvinyl alcohols;
copolymers formed from vinyl alcohol and olefin monomers, such as the copolymers formed from vinyl alcohol and ethylene monomers (EVOH copolymers); and
partially hydrolyzed vinyl alcohol copolymers, that is to say still containing nonhydrolyzed vinyl acetate units;
polyethylene glycols;
collagen;
polyethylene terephthalates (PET);
polyethylene naphthalates (PEN);
polyamides;
polysaccharides, in particular cellulose polymers and their derivatives (among which preference is given in particular to $C_1$-$C_4$ alkyl celluloses and more particularly methyl celluloses), and starches, which are optionally modified;
polyvinyl chlorides (PVCs);
polyvinylidene chlorides (PVDCs);
polyacrylonitriles (PANs);
polyacrylate resins, such as, in particular, polymethyl acrylates;
copolymers, at least one of the monomers of which is of acrylate type;
and their mixtures.

Polyvinyl alcohols and the copolymers formed from vinyl alcohol and olefin monomers are particularly preferred. Among the latter, preference is very particularly given to the copolymers formed of vinyl alcohol and ethylene monomers or EVOH copolymers.

As set out above, the mean thickness of the protective layer according to the invention preferably ranges from 0.1 to 10 μm. More preferably, the mean thickness of the protective layer ranges from 0.5 to 10 μm, and better still from 2 to 8 μm.

Likewise, the total amount of film-forming polymer represents from 0.1 to 4% by weight, preferably from 0.5 to 4% by weight and more preferably still from 1 to 3% by weight, with respect to the total weight of the initial particles.

The particles are formed of a porous material comprising a porous inorganic support and at least 0.1% by weight of one or more compounds chosen from organic compounds, halogen compounds, boron compounds and phosphorus compounds.

Everything which has been described above relating to the protection process applies, of course, to the protected material according to the present invention.

The examples which follow are given purely by way of illustration of the present invention.

EXAMPLES

Preparation of the Adsorbent Material A:

Examples 1 to 5 below were carried out starting from an adsorbent material of commercial γ-alumina type which has a specific surface of 200 $m^2$/g and which is provided in the form of extrudates of trilobal shape having a number-average diameter of 1.2 mm and with a number-average length of 3.8 mm. In order to simulate the final state of this adsorbent after use in a hydrotreating process, 2 kg of adsorbent were solely impregnated with 160 g of crude gas oil and then treated at 70° C. under a nitrogen stream of 10 $m^3$/h for 1 h, this second stage being used to mimic an in-situ stripping stage. The adsorbent A is thus obtained.

The analysis of the adsorbent A shows that it contains 6.9% by weight of carbon. The analysis of the VOCs (measurement method described below) shows an emission of 215 ppm of hydrocarbons into the air.

Example 1: (In Accordance with the Invention)

2 kg of adsorbent A were placed in a completely perforated stainless steel drum having a volume of 18 liters (working volume of 5 l), at a rotational speed of 22 revolutions/minute, completely traversed by a stream of hot air of 150 $m^3$/h at 90° C. A solution of film-forming polymer is sprayed over the particles using a twin-fluid atomization nozzle, in the way described below. The stream of hot air is produced parallel to the spray jet and in the same direction (downward stream).

A solution of 250 g of polyethylene/polyvinyl alcohol copolymer (sold under the name Exceval by Kuraray) at 8% by weight in water was injected over the adsorbent particles using a twin-fluid atomization nozzle (970/0 S75 model of the Schlick brand, with liquid insert with an internal diameter of 1 mm), with a flow rate of solution of 10 g/min and a relative pressure of compressed air (relative atomization pressure) of $1.2 \times 10^5$ Pa.

The water is continuously evaporated, which results in the formation of a layer of polymer at the surface of the adsorbent particles.

After complete injection of the liquid, the adsorbent is stirred for a further 5 minutes and then cooled to ambient temperature.

The adsorbent B according to the invention, the particles of which are covered with a layer of polyethylene/polyvinyl alcohol copolymer, was thus obtained.

The analysis of the adsorbent B shows that it contains 7.4% by weight of carbon. High definition observation in $\lambda 200$ zoom of 10 grains carried out by scanning electron microscopy has made it possible to measure a homogeneity in layer thickness of 68% (measurement method described below) and also a mean thickness of the layer of 2.5 μm. The analysis of the VOCs (measurement method described below) shows an emission of 16 ppm of hydrocarbons into the air.

Example 2: (In Accordance with the Invention)

2 kg of adsorbent A were placed in a completely perforated stainless steel drum having a volume of 18 liters (working volume of 5 l), at a rotational speed of 22 revolutions/minute, completely traversed by a stream of hot air of 150 m³/h at 90° C. A solution of film-forming polymer is sprayed over the particles using a twin-fluid atomization nozzle, in the way described below. The stream of hot air is produced parallel to the spray jet and in the same direction (downward stream).

A solution of 250 g of polyethylene/polyvinyl alcohol copolymer (sold under the name Exceval by Kuraray) at 8% by weight in water was injected over the adsorbent particles using a twin-fluid atomization nozzle (970/0 S75 model of the Schlick brand, with liquid insert with an internal diameter of 1 mm), with a flow rate of solution of 10 g/min and a relative pressure of compressed air (relative atomization pressure) of $1.6 \times 10^5$ Pa.

The water is continuously evaporated, which results in the formation of a layer of polymer at the surface of the adsorbent particles.

After complete injection of the liquid, the adsorbent is stirred for a further 5 minutes and then cooled to ambient temperature.

The adsorbent C according to the invention, the particles of which are covered with a layer of polyethylene/polyvinyl alcohol copolymer, was thus obtained.

The analysis of the adsorbent C shows that it contains 7.3% by weight of carbon. High definition observation in ×200 zoom of 10 grains carried out by scanning electron microscopy has made it possible to measure a homogeneity in layer thickness of 73% (measurement method described below) and also a mean thickness of the layer of 2.5 μm. The analysis of the VOCs (measurement method described below) shows an emission of 10 ppm of hydrocarbons into the air.

Example 3: (Comparative)

2 kg of adsorbent A were placed in a non-perforated stainless steel drum having a volume of 18 liters (working volume of 5 l), at a rotational speed of 22 revolutions/minute, and a stream of hot air of 150 m³/h at 90° C. is directed onto the surface of the adsorbent bed. The hot air enters via an inlet located within the drum and exits via the opening located in the front of the drum, without traversing the adsorbent bed (seep-flow bed).

A solution of 250 g of polyethylene/polyvinyl alcohol copolymer (sold under the name Exceval by Kuraray) at 8% by weight in water was injected over the adsorbent particles using a twin-fluid atomization nozzle (970/0 S75 model of the Schlick brand, with liquid insert with an internal diameter of 1 mm), with a flow rate of solution of 10 g/min and a relative pressure of compressed air (relative atomization pressure) of $1.2 \times 10^5$ Pa.

The water is continuously evaporated, which results in the formation of a layer of polymer at the surface of the adsorbent particles.

After complete injection of the liquid, the adsorbent is stirred for a further 5 minutes and then cooled to ambient temperature.

The adsorbent D not in accordance with the invention, the particles of which are covered with a layer of polyethylene/polyvinyl alcohol copolymer, was thus obtained.

The analysis of the adsorbent D shows that it contains 7.5% by weight of carbon. High definition observation in ×200 zoom of 10 grains carried out by scanning electron microscopy has made it possible to measure a homogeneity in layer thickness of 51% (measurement method described below) and also a mean thickness of the layer of 2.8 μm. The analysis of the VOCs (measurement method described below) shows an emission of 42 ppm of hydrocarbons into the air.

Example 4: (Comparative)

2 kg of adsorbent A were placed in a completely perforated stainless steel drum having a volume of 18 liters (working volume of 5 l), at a rotational speed of 22 revolutions/minute, completely traversed by a stream of hot air of 150 m³/h at 90° C. A solution of film-forming polymer is sprayed over the particles using a twin-fluid atomization nozzle, in the way described below. The stream of hot air is produced parallel to the spray jet and in the same direction (downward stream).

A solution of 250 g of polyethylene/polyvinyl alcohol copolymer (sold under the name Exceval by Kuraray) at 8% by weight in water was injected over the adsorbent particles using a twin-fluid atomization nozzle (970/0 S75 model of the Schlick brand, with liquid insert with an internal diameter of 1 mm), with a flow rate of solution of 10 g/min and a relative pressure of compressed air (relative atomization pressure) of $0.6 \times 10^5$ Pa.

The water is continuously evaporated, which results in the formation of a layer of polymer at the surface of the adsorbent particles.

After complete injection of the liquid, the adsorbent is stirred for a further 5 minutes and then cooled to ambient temperature.

The adsorbent E not in accordance with the invention, the particles of which are covered with a layer of polyethylene/polyvinyl alcohol copolymer, was thus obtained.

The analysis of the adsorbent E shows that it contains 7.4% by weight of carbon. High definition observation in ×200 zoom of 10 grains carried out by scanning electron microscopy has made it possible to measure a homogeneity in layer thickness of 60% (measurement method described below) and also a mean thickness of the layer of 2.6 µm. The analysis of the VOCs (measurement method described below) shows an emission of 28 ppm of hydrocarbons into the air.

Example 5: (Comparative)

2 kg of adsorbent A were placed in a completely perforated stainless steel drum having a volume of 18 liters (working volume of 5 l), at a rotational speed of 22 revolutions/minute, completely traversed by a stream of hot air of 150 m$^3$/h at 90° C. By way of comparison, water not containing polymer is sprayed over the particles using a twin-fluid atomization nozzle, in the way described below. The stream of hot air is produced parallel to the spray jet and in the same direction (downward stream).

250 g of water were injected over the adsorbent particles using a twin-fluid atomization nozzle (970/0 S75 model of the Schlick brand, with a liquid insert with an internal diameter of 1 mm), with a flow rate of 10 g/min and a relative pressure of compressed air (relative atomization pressure) of $1.2 \times 10^5$ Pa.

After complete injection of the liquid, the adsorbent is stirred for a further 5 minutes and then cooled to ambient temperature.

The adsorbent F not in accordance with the invention was thus obtained.

The analysis of the adsorbent F shows that it contains 6.7% by weight of carbon. The analysis of the VOCs (measurement method described below) shows an emission of 110 ppm of hydrocarbons into the air.

Examples 6 to 10 below were carried out starting from a commercial regenerated hydrotreating catalyst which contains 20% by weight of $MoO_3$ and 5% by weight of CoO on an alumina support and which is provided in the form of extrudates of cylindrical shape having a number-average diameter of 1.3 mm and with a number-average length of 3.2 mm.

Preparation of Catalyst G:

2 kg of regenerated catalyst are placed in a mixing pan and then impregnated to saturation of the pore volume with a solution consisting of 200 g of polyethylene glycol 200 (PEG-200) and 660 g of demineralized water.

After impregnation, the catalyst was subjected to a maturing stage for 17 hours at a temperature of 70° C., and then dried under nitrogen in an oven heated to 200° C., in order to obtain catalyst G.

The CO analysis (measurement method described below) shows an emission of 144 ppm of CO into the air.

Example 6 (In Accordance with the Invention)

2 kg of catalyst G were placed in a completely perforated stainless steel drum having a volume of 18 liters (working volume of 5 l), at a rotational speed of 22 revolutions/minute, completely traversed by a stream of hot air of 160 m$^3$/h at 90° C. A solution of film-forming polymer is sprayed over the particles using a twin-fluid atomization nozzle, in the way described below. The stream of hot air is produced parallel to the spray jet and in the same direction (downward stream).

A solution of 800 g of polyethylene/polyvinyl alcohol copolymer (sold under the name Exceval by Kuraray) at 5% by weight in water was injected over the catalyst particles using a twin-fluid atomization nozzle (970/0 S75 model of the Schlick brand, with liquid insert with an internal diameter of 1 mm), with a flow rate of solution of 7 g/min and a relative pressure of compressed air (relative atomization pressure) of $1.2 \times 10^5$ Pa.

The water is continuously evaporated, which results in the formation of a layer of polymer at the surface of the catalyst particles.

After complete injection of the liquid, the catalyst is stirred for a further 5 minutes and then cooled to ambient temperature.

The catalyst H according to the invention, the particles of which are covered with a layer of polyethylene/polyvinyl alcohol copolymer, was thus obtained.

High definition observation in ×200 zoom of 10 grains carried out by scanning electron microscopy has made it possible to measure a homogeneity in layer thickness of 76% (measurement method described below) and also a mean thickness of the layer of 5.8 tam. The CO analysis (measurement method described below) shows an emission of 6 ppm of CO into the air.

Example 7 (Comparative)

2 kg of catalyst G were placed in a non-perforated stainless steel drum having a volume of 18 liters (working volume of 5 l), at a rotational speed of 22 revolutions/minute, and a stream of hot air of 160 m$^3$/h at 90° C. is directed onto the surface of the adsorbent bed. The hot air enters via an inlet located within the drum and exits via the opening located in the front of the drum, without traversing the adsorbent bed (seep-flow bed).

A solution of 800 g of polyethylene/polyvinyl alcohol copolymer (sold under the name Exceval by Kuraray) at 5% by weight in water was injected over the catalyst particles using a twin-fluid atomization nozzle (970/0 S75 model of the Schlick brand, with liquid insert with an internal diameter of 1 mm), with a flow rate of 7 g/min and a relative pressure of compressed air (relative atomization pressure) of $1.2 \times 10^5$ Pa.

The water is continuously evaporated, which results in the formation of a layer of polymer at the surface of the catalyst particles.

After complete injection of the liquid, the catalyst is stirred for a further 5 minutes and then cooled to ambient temperature.

The catalyst I not in accordance with the invention, the particles of which are covered with a layer of polyethylene/polyvinyl alcohol copolymer, was thus obtained.

High definition observation in ×200 zoom of 10 grains carried out by scanning electron microscopy has made it possible to measure a homogeneity in layer thickness of 53% (measurement method described below) and also a mean thickness of the layer of 6.1 µm. The CO analysis (measurement method described below) shows an emission of 26 ppm of CO into the air.

Example 8 (Comparative)

2 kg of catalyst G were placed in a completely perforated stainless steel drum having a volume of 18 liters (working volume of 5 l), at a rotational speed of 22 revolutions/ minute, completely traversed by a stream of hot air of 160 m³/h at 90° C. A solution of film-forming polymer is sprayed over the particles using a twin-fluid atomization nozzle, in the way described below. The stream of hot air is produced parallel to the spray jet and in the same direction (downward stream).

A solution of 800 g of polyethylene/polyvinyl alcohol copolymer (sold under the name Exceval by Kuraray) at 5% by weight in water was injected over the catalyst particles using a twin-fluid atomization nozzle (970/0 S75 model of the Schlick brand, with liquid insert with an internal diameter of 1 mm), with a flow rate of solution of 7 g/min and a relative pressure of compressed air (relative atomization pressure) of $0.6 \times 10^5$ Pa.

The water is continuously evaporated, which results in the formation of a layer of polymer at the surface of the catalyst particles.

After complete injection of the liquid, the catalyst is stirred for a further 5 minutes and then cooled to ambient temperature.

The catalyst J not in accordance with the invention, the particles of which are covered with a layer of polyethylene/polyvinyl alcohol copolymer, was thus obtained.

High definition observation in ×200 zoom of 10 grains carried out by scanning electron microscopy has made it possible to measure a homogeneity in layer thickness of 61% (measurement method described below) and also a mean thickness of the layer of 6.0 μm. The CO analysis (measurement method described below) shows an emission of 18 ppm of CO into the air.

Example 9 (Comparative)

2 kg of catalyst G were placed in a completely perforated stainless steel drum having a volume of 18 liters (working volume of 5 l), at a rotational speed of 22 revolutions/ minute, completely traversed by a stream of hot air of 160 m³/h at 90° C. By way of comparison, water not containing polymer is sprayed over the particles using a twin-fluid atomization nozzle, in the way described below. The stream of hot air is produced parallel to the spray jet and in the same direction (downward stream).

800 g of water were injected over the catalyst particles using a twin-fluid atomization nozzle (970/0 S75 model of the Schlick brand, with liquid insert with an internal diameter of 1 mm), with a flow rate of 10 g/min and a relative pressure of compressed air (relative atomization pressure) of $1.2 \times 10^5$ Pa.

After complete injection of the liquid, the catalyst is stirred for a further 5 minutes and then cooled to ambient temperature.

The catalyst K not in accordance with the invention was thus obtained.

The CO analysis (measurement method described below) shows an emission of 128 ppm of CO into the air.

The properties of adsorbents and catalysts A to K described in the examples above were evaluated by determining the homogeneity in the layer thickness. For adsorbents A to F alone, the VOC measurement was additionally carried out. Likewise, the CO analysis was carried out for catalysts G to K alone. The measurement methods are described below:

The Homogeneity in the Thickness of the Coating Layer and the Mean Thickness of the Layer:

This parameter characterizes the homogeneity and thus the quality of the polymer layer deposited at the surface of the adsorbent grain.

In order to obtain a representative sample, the product to be analyzed is randomly divided several times in succession by using, for example, a riffle splitter until approximately 20 grains to be analyzed are obtained. The first preparation consists of a clean cutting or splitting of each grain, which will make possible observation of the grain in section by microscopy. For the grains of extruded type, cooling with liquid nitrogen followed by manual splitting of the grain is generally sufficient to obtain a clean cut. For grains of different shapes, it is possible, for example, to use cutting tools customary in microscopy, such as a microtome. Among the split grains, ten are randomly chosen, care being taken to exclude the grains which have not been very cleanly cut/ split. It is also important to note that, in the case where some grains were agglomerated with one another, these are not selected for the measurement.

These ten grains are introduced for observation into a scanning electron microscope, so as to be able to observe the cutting plane. For each grain, a portion of the external perimeter of the cutting/splitting plane of the grain, with a total length of at least 900 μm, is randomly selected. The magnification and the definition of the image have to be sufficient to be able to measure the thickness of the polymer layer with a margin of error of less than 5%. The first measurement point is chosen at one end of the observation region. The thickness T1 of the coating is accurately measured at this point. A length of 60 μm along the perimeter of the grain is then measured and a further measurement of thickness T2 is taken at this spot. This stage is repeated until between 15 and 20 measurements of thicknesses for this same grain have been carried out. From this list of measurements of thicknesses, the homogeneity of the thickness of the coating layer of the grain is calculated in the following way:

Standardized Homogeneity with Regard to the Grain j (in %):

$$H_j = \left(1 - \frac{\frac{1}{n}\sum_1^n |E_i - \overline{E}_j|}{\overline{E}_j}\right) \times 100$$

where $\overline{E}_j$ is the mean thickness of the layer on the grain j and n is the number of measurements carried out.

The homogeneity in the layer thickness $H_T$ of the sample is defined as being the mean of the homogeneities $H_j$ measured on each of the ten grains.

The mean thickness of the layer on the sample is defined as being the mean of the thicknesses $\overline{E}_j$ measured on each of the ten grains.

The VOCs (Volatile Organic Compounds) Emission at Low Temperature:

A sample of 25 g of catalyst or adsorbent is weighed out and then placed in a 1 l leaktight container equipped with a septum. The container is subsequently placed for 24 h in an oven thermostatically controlled at 120° C. After 24 h, the container is taken out and allowed to cool to ambient temperature. An analysis of the volatile organic compounds (or "VOCs") is then carried out on the gas present in the container, by withdrawing a sample through the septum. The analysis of the gas can, for example, be carried out with an analyzer using a photoionization detector (PID), such as the MiniRAE Lite sold by RAE Systems, which directly gives the result in ppm of total VOCs.

The CO (Carbon Monoxide) Emissions at Low Temperature:

A sample of 90 g of catalyst is weighed out and then placed in a 200 mL container under air which is subsequently rendered leaktight using a stopper equipped with a septum. The container is subsequently placed for two days (48 h) in an oven thermostatically controlled at 45° C. After 48 h, an analysis of carbon monoxide (CO) is then carried out on the gas present in the container, by withdrawing a sample through the septum. The carbon monoxide content is typically measured by a gas analyzer with a selective CO sensor, such as, for example, the 317-3 model of the Testo brand, which directly gives the result in ppm of CO.

For each adsorbent A to F, a determination was carried out of the homogeneity in the thickness of the coating layer and of the emissions of VOCs immediately after their preparation.

For each catalyst G to K, a determination was carried out of the homogeneity in the thickness of the coating layer and of the CO emissions immediately after their preparation.

The results obtained are collated in Tables 1 and 2 below:

TABLE 1

| | Equipment | Relative atomization pressure ($10^5$ Pa) | Emission of VOCs (ppm) | Homogeneity layer thickness (%) |
|---|---|---|---|---|
| Adsorbent A (untreated) | | | 215 | / |
| Adsorbent B (invention) | Perforated drum | 1.2 | 16 | 68 |
| Adsorbent C (invention) | Perforated drum | 1.6 | 10 | 73 |
| Adsorbent D (comparative) | Non-perforated drum | 1.2 | 42 | 51 |
| Adsorbent E (comparative) | Perforated drum | 0.6 | 28 | 60 |
| Adsorbent F (comparative) | Perforated drum | 1.2 | 110 | / |

TABLE 2

| | Equipment | Relative atomization pressure ($10^5$ Pa) | CO emission (ppm) | Homogeneity layer thickness (%) |
|---|---|---|---|---|
| Catalyst G (untreated) | | | 144 | / |
| Catalyst H (invention) | Perforated drum | 1.2 | 6 | 76 |
| Catalyst I (comparative) | Non-perforated drum | 1.2 | 26 | 53 |
| Catalyst J (comparative) | Perforated drum | 0.6 | 18 | 61 |
| Catalyst K (comparative) | Perforated drum | 1.2 | 128 | / |

The above results demonstrate that the process according to the invention, combining the use of a technology in which the particles are traversed by a stream of gas and the spraying of film-forming polymer and carried out with an atomization pressure as claimed, makes it possible to obtain better results in terms of limitation of emissions of undesirable gases.

Furthermore, this process makes it possible to obtain a thin coating layer at the surface of the particles which is more homogeneous.

The invention claimed is:

1. A process for limiting the emissions of gases from a porous material in the form of particles comprising a porous inorganic support and at least 0.1% by weight of one or more compounds chosen from organic compounds, halogen compounds, boron compounds and phosphorus compounds, the process comprising:
   placing the particles in motion within a hot gas stream traversing the particles;
   spraying, while the particles are in motion, a liquid composition containing one or more film-forming polymer(s) over the moving particles by means of a twin-fluid atomization nozzle, in which the liquid composition is mixed with a pressurized gas, with a relative atomization pressure of greater than or equal to $0.7 \times 10^5$ Pa to provide particles each having a protective layer containing the film-forming polymer(s), where the relative atomization pressure is the difference in pressure between the pressure of the gas inside the nozzle and atmospheric pressure;
   where the protective layer is characterized as having a mean thickness of less than or equal to 20 μm on the surface of said particles, and
   where the particles having the protective layer containing the film-forming polymer(s) exhibit decreased emission of gas relative to identical particles without a protective layer containing the film-forming polymer.

2. The process according to claim 1, characterized in that the relative atomization pressure ranges from $0.7 \times 10^5$ to $4 \times 10^5$ Pa.

3. The process according to claim 1, characterized in that the liquid composition is a solution or a dispersion of the film-forming polymer(s) in a solvent.

4. The process according to claim 3, where the liquid composition contains from 0.1 to 50% by weight of film-forming polymer.

5. The process according to claim 1, characterized in that it is carried out in a perforated drum in which the particles are placed in motion, the said perforated drum being continuously traversed by a stream of hot gas.

6. The process according to claim 5, characterized in that it is carried out in a perforated drum operating in continuous mode.

7. The process according to claim 1, characterized in that it is carried out by placing the particles in fluidized bed using the stream of hot gas.

8. The process according to claim 1, characterized in that the stream of gas traversing the particles exhibits a temperature ranging from 30 to 150° C.

9. The process according to claim 1, characterized in that the flow rate of the stream of gas is from 5 to 100 m³ per hour and per kilogram of catalyst.

10. The process according to claim 1, characterized in that the protective layer comprises from 50 to 100% by weight of one or more film-forming polymer(s).

11. The process according to claim 1, characterized in that the film-forming polymer(s) are chosen from a group consisting of:
   vinyl alcohol homo- and copolymers;
   polyethylene glycols;
   collagen;
   polyethylene terephthalates (PET);
   polyethylene naphthalates (PEN);
   polyamides;

polysaccharides;
polyvinyl chlorides (PVCs);
polyvinylidene chlorides (PVDCs);
polyacrylonitriles (PANs);
polyacrylate resins;
copolymers, at least one of the monomers of which is of acrylate type;
and their mixtures.

12. The process according to claim 1, characterized in that the mean thickness of the protective layer ranges from 0.1 to 10 µm.

13. The process according to claim 1, characterized in that the total amount of film-forming polymer employed ranges from 0.1 to 4% by weight, with respect to the total weight of the initial particles.

14. The process according to claim 1, characterized in that the porous material in the form of particles is a catalyst comprising a refractory oxide support on which is deposited at least one metal or metal compound.

15. The process according to claim 14, characterized in that the at least one metal or metal compound is chosen from the metals of Group VIII and the metals of Group VIb of the Periodic Table of the Elements and/or at least one inorganic compound of such a metal.

16. The process according to claim 1, characterized in that the porous material in the form of particles is an adsorbent agent in the form of porous particles comprising one or more porous materials chosen from a group consisting of active charcoals, zeolites, aluminas, silica gels and activated clays.

17. The process according to claim 1, where for the porous material in the form of particles comprising at least 0.1% by weight of one or more compounds chosen from organic compounds, halogen compounds, boron compounds and phosphorus compounds, the particles contain one or more organic compounds which comprise from 1 to 15 carbon atoms.

18. The process according to claim 1, characterized in that the organic, halogen, boron and/or phosphorus compounds are present in a total content ranging from 0.1 to 20% by weight, with respect to the total weight of the said particles.

19. A porous material in the form of particles which are covered with a protective layer comprising one or more film-forming polymer(s), the film-forming polymer(s) representing from 0.1 to 4% by weight, with respect to the total weight of the particles, and being chosen from a group consisting of:
vinyl alcohol homo- and copolymers;
polyethylene glycols;
collagen;
polyethylene terephthalates;
polyethylene naphthalates;
polyamides;
polysaccharides;
polyvinyl chlorides;
polyvinylidene chlorides;
polyacrylonitriles;
polyacrylate resins;
copolymers, at least one of the monomers of which is of acrylate type;
and their mixtures,
where the protective layer is characterized as having a mean thickness of less than or equal to 20 µm on the surface of said particles.

20. The porous material according to claim 19, characterized in that the particles exhibit a homogeneity in layer thickness of greater than or equal to 65%.

* * * * *

UNITED STATES PATENT AND TRADEMARK OFFICE
CERTIFICATE OF CORRECTION

PATENT NO. : 10,207,251 B2
APPLICATION NO. : 15/392176
DATED : February 19, 2019
INVENTOR(S) : Dufresne et al.

It is certified that error appears in the above-identified patent and that said Letters Patent is hereby corrected as shown below:

On the Title Page

Item (57) ABSTRACT, Line 12, delete "$0.7 \times 100^5$ Pa" and insert --$0.7 \times 10^5$ Pa--

In the Specification

Column 14, Line 25, delete "5.8 tam" and insert --5.8 µm--

Signed and Sealed this
Twenty-fifth Day of June, 2019

Andrei Iancu
*Director of the United States Patent and Trademark Office*